June 22, 1948.   R. S. REYNOLDS   2,443,870
METHOD OF UNITING LAMINATIONS OF ALUMINUM AND TIN
Filed Jan. 26, 1944
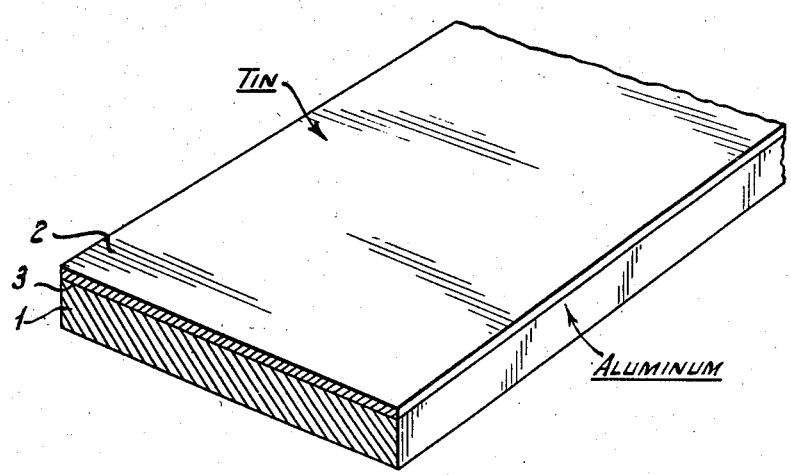
INVENTOR
RICHARD S. REYNOLDS.
BY
ATTORNEY Patented June 22, 1948

2,443,870

UNITED STATES PATENT OFFICE 2,443,870

METHOD OF UNITING LAMINATIONS OF ALUMINUM AND TIN

Richard S. Reynolds, Richmond, Va.

Application January 26, 1944, Serial No. 519,828

2 Claims. (Cl. 29—189)

This invention relates to the production of a composite metallic body consisting of aluminum and tin in laminations united by the uniform bond throughout the contiguous surfaces of the metals, the bond being such that the metallic body may be rolled, drawn, shaped and otherwise worked with assurance that the bond between the laminations will not be destroyed, the bond being such that the composite structure may be subjected to repeated heating and cooling without affecting the bond, notwithstanding the relatively different expansion coefficients of the two metals.

The composite metallic product is capable of a multiple of uses and it is particularly desirable for the production of cooking utensils, wherein the outer structure of the vessels will be aluminum and the inner structure of tin, with consequent utilization of the advantages of both metals, the tin being particularly resistant to discoloration and being easy to clean. My product also is of special use in metallic containers such as cans, kegs and vats for receiving products having chemical action with aluminum, and where aluminum per se would be unsuitable. A further advantage is that sheets of my laminated product may readily be soldered with the common solders now used for tinned material such as tin plate.

In the drawing which forms a part of this application there is illustrated one possible form of final product that may be produced in accordance with the method of this invention. In this drawing, 1 indicates the strip of aluminum or aluminum alloy; 2 indicates the strip of tin, and 3 the bond between the two strips.

Although aluminum and tin vary greatly in their physical constants, I have discovered that a layer of tin and a layer of aluminum may be strongly bonded by an initial step employing relatively low temperatures, followed by a rolling operation at any suitable temperature, as for example, by cold-rolling, and that the method is applicable to the various aluminum alloys as well as to commercially pure aluminum.

As an example, aluminum in the form of a continuous strip of a suitable thickness, is heated to a temperature approximately 500° F., or a temperature slightly above the melting point of tin, and is passed to a mechanical scratch brushing station, preferably employing a series of reciprocating brushes. As the brushes reciprocate, molten tin is deposited upon the surface of the aluminum, and the brushing action brushes the tin into the aluminum, forming a surface alloy. In this connection, a tin-aluminum eutectic of low aluminum content is formed at 444–445° F. The brushes will be of steel or other heat resisting metal suitable for the purpose.

Continuing the specific example, the metal, as it emerges from the scratch brushing station, is cooled and rewound to a coil. This coil is brought to a rolling mill provided with a double let-off, one for the aluminum strip and the other for a tin strip of the thickness required. The two strips are then passed through a rolling mill with the tin strip adjacent to the tin-aluminum bonding alloy layer of the aluminum. Under the pressure of the rolling operation, the metal flow incident to the operation serves to establish a bond by the interlocking of the bonding layer with the tin strip, which bond will be co-extensive with the contacting faces. The rolling operation is controlled to bring the laminated structure down to a desired thickness.

An advantage exists in using a relatively heavy aluminum strip or sheet and rolling it down to a substantially less thickness along with the tin strip or sheet, in that the aluminum thereby is cold-worked, and as the tin has a melting point below the practical annealing temperature of aluminum, the final structure need not be subjected to an annealing operation. As the structure will find its greatest use in a form wherein it may subsequently be drawn or further worked, it is desired that the aluminum strip or sheet be in an annealed or slightly hard state such as quarter-hard or half-hard.

Although practice of the invention is not limited to any specific thickness of aluminum strip or sheet, or other form of the aluminum body, or the proportion of cladding to aluminum, or to the cladding of tin on one or both sides of the aluminum, generally the cladding of one side of the aluminum will suffice, and a suitable proportion of tin to aluminum in usual cases may be 20% by volume of tin. This, however, will be governed by the nature of the final product to be formed, and the uses thereof.

The depth of the tin-aluminum bonding layer can be predetermined. I prefer that the bonding layer be relatively thin, and it should be substantially uniform. It may be composed of pure tin or of a suitable tin base alloy. Likewise, the tin strip or sheet may be of commercially pure tin or a tin base alloy, commercially pure tin being preferred.

It will be understood by my method, tin surfaced aluminum strips, sheets, foils, plates, and slabs may be formed for rolling, drawing, spinning, stamping and other working, without destroying the bond between the laminations, and that many useful articles may be made therefrom.

Having described my invention, what I claim and desire to secure by Letters Patent is as follows:

1. The method of uniting laminations of aluminum and tin by a uniform bond which consists in the step of heating a continuous aluminum strip to a temperature of approximately 500° F. and brushing molten tin upon the aluminum strip to form a tin-aluminum alloy eutectic of low aluminum content at 444 to 445° F., followed by cooling of the strip and rewinding to a coil and finally cold rolling of the said strip and a tin strip to interlock and shape the aluminum strip, the tin-aluminum layer and the tin strip into one composite body.

2. The method of uniting laminations of aluminum and tin by a uniform bond which consists in the step of heating a continuous aluminum strip to a temperature slightly above the melting point of tin and brushing molten tin upon the aluminum strip to form a tin-aluminum alloy eutectic of low aluminum content at 440° F. to 445° F. followed by cooling of the strip and rolling the strip and a tin strip to interlock and shape the aluminum strip, the tin-aluminum layer and the tin strip into one composite body.

RICHARD S. REYNOLDS.

REFERENCES CITED

The following references are of record in the file of this patent:

UNITED STATES PATENTS

| Number | Name | Date |
|---|---|---|
| 1,554,097 | Jordan | Sept. 15, 1925 |
| 1,816,805 | Gangloff | July 28, 1931 |
| 2,087,716 | Banscher | July 20, 1937 |

FOREIGN PATENTS

| Number | Country | Date |
|---|---|---|
| 210,377 | Sweden | Sept. 16, 1940 |
| 548,330 | Great Britain | Oct. 6, 1942 |